United States Patent [19]

Moore

[11] Patent Number: 5,411,568
[45] Date of Patent: May 2, 1995

[54] HIGHLY AVAILABLE WASTE BASED NITROGEN FERTILIZER

[75] Inventor: William P. Moore, Hopewell, Va.

[73] Assignee: Harmony Products Inc., Chesapeake, Va.

[21] Appl. No.: 249,223

[22] Filed: May 25, 1994

[51] Int. Cl.⁶ .......................... C05C 9/02; C05F 15/00
[52] U.S. Cl. ............................................. 71/22; 71/28; 71/64.11; 71/64.13; 71/64.06
[58] Field of Search ..................... 71/1, 11, 22, 28–30, 71/64.01, 64.03, 64.06, 64.11, 64.13

[56] References Cited

U.S. PATENT DOCUMENTS

| | | | |
|---|---|---|---|
| 2,977,214 | 3/1961 | McLellan | 71/64.04 |
| 3,655,395 | 4/1972 | Karnemaat | 71/28 |
| 3,713,800 | 1/1973 | Karnemaat | 71/14 |
| 3,939,280 | 2/1976 | Karnemaat | 426/69 |
| 3,942,970 | 3/1976 | O'Donnell | 71/12 |
| 4,057,392 | 11/1977 | O'Donnell | 71/28 |
| 4,081,366 | 3/1978 | O'Donnell | 71/13 |
| 4,304,588 | 12/1981 | Moore | 71/28 |
| 4,997,469 | 3/1991 | Moore | 71/28 |
| 5,021,077 | 6/1991 | Moore | 71/28 |
| 5,240,490 | 8/1993 | Moore | 71/17 |

Primary Examiner—Ferris Lander

[57] ABSTRACT

A new method of preparing granular slow release nitrogen fertilizer, exhibiting substantially complete nitrogen availability as a plant nutrient, from nitrogenous organic wastes, such as animal excretia, by coreacting particulate dry conditioned nitrogenous organic waste and reactive ureaformaldehyde oligomer; and the slow release fertilizer exhibiting improved nitrogen availability prepared by the new method. The preconditioning of the waste and the preparation of the reactive oligomer are arranged so that the method for forming the new composition is effectively carried out in a damp dry, free flowing particulate system. Parameters are provided for: dry conditioning the wastes, oligomer forming, coreacting, and granulating.

19 Claims, No Drawings

HIGHLY AVAILABLE WASTE BASED NITROGEN FERTILIZER

BACKGROUND OF THE INVENTION

1. Field of the Invention

This invention relates to particulate organic waste based fertilizers and methods for their preparation. More particularly, it relates to organic waste based nitrogen fertilizers, exhibiting high nitrogen availabilities, and to a new method of effectively preparing them from nitrogenous organic wastes, and urea and formaldehyde. The new method relates to the discovery of new and improved conditions for reacting organic wastes with urea and formaldehyde to produce highly available nitrogen nutrients from organic wastes which normally exhibit low nitrogen availabilities as plant foods.

2. Description of Related Art

Large amounts of organic waste materials containing nitrogen are formed in municipal, industrial, and agricultural operations. Wastes, such as poultry manures, waste water solids, sewage sludges and municipal garbage are produced as damp, composted, or dried solids. The amount of nitrogen available from these waste sources is so large and has created so much environmental and economic interest that the art contains large amounts of work carried out in attempts to use these wastes as nitrogen fertilizer sources. Some of the work has involved reaction of the waste materials with formaldehyde, urea, and ureaformaldehyde concentrates and resins, in attempts to eliminate malodors, usually present in the wastes.

In U.S. Pat. No. 3,655,395, John Karnemaat disclosed a process for treating industrial and municipal wastes, suspended or dissolved in water, by stepwise treatment with concentrated formaldehyde, nitric acid, and urea, to form ureaformaldehyde condensation products which were then dried. He extended his technology in U.S. Pat. No. 3,939,280, which taught converting poultry manure by treatment with a catalytic amount of nontoxic acid, urea, and a formaldehyde supplying substance.

In U.S. Pat. No. 3,942,970, James O'Donnell disclosed a system for producing granular, high nitrogen, odorless fertilizer from sewage filter sludge. O'Donnell added acid to bring pH of the sludge to 3–5 and reacted the sludge with methylolurea at pH 3–5, and a temperature of 30 to 80° C., using vigorous agitation. In U.S. Pat. No. 4,081,366, O'Donnell dewatered the reacted ureaformaldehyde-sludge mixture by vacuum filtration, and in 4,057,392, provided an apparatus and process for treating sewage sludge filter cake to provide a slow release nitrogen. The maximum availability of his nitrogen was 55 percent.

In U.S. Pat. No. 2,977,214, McLellan produced granules of nitrogenous sewage sludge by compacting between high pressure rolls, breaking the compacted pieces, and then screening to the desired particle size.

In my U.S. Pat. No. 4,997,469, a method was provided for producing high integrity, low odor, natural based granular fertilizers by mixing aqueous formaldehyde with natural nitrogenous chick waste, with or without urea, heating until some of the chick waste nitrogen was in water soluble form, forming granules, and neutralizing to pH 6.5–8.0 by adding mineral acid, and hardening the granules by heating.

The technology was further advanced in my U.S. Pat. No. 5,240,490, which provided a continuous process for non-destructive recovery of natural nitrogenous materials as particulate agricultural nutrients from poultry waste in a fluid bed granulator. Maximum nitrogen Availability Index provided was 45.5 in those products.

Thus, the prior art has provided several effective methods for recovering natural waste nitrogenous materials as nitrogen fertilizers having reduced odors. For a nitrogen fertilizer to be an effective plant food, the nitrogen from that fertilizer must be substantially available in the soil to the roots and foliage of growing plants, preferably within a single growing season.

Agronomists through years of field and greenhouse studies have been able to correlate the effectiveness of water insoluble nitrogen release with an Availability Index whereby complete one season release of water insoluble nitrogen is indicated by an Availability Index of 100, while no release would be indicated by 0. The Availability Index is derived by equation, as follows:

$$A = \frac{(CWIN - NPIN)100}{CWIN}$$

$A =$ Availability Index
$CWIN =$ Cold Water Insoluble Nitrogen
$NPIN =$ Neutral Permanganate Insoluble Nitrogen CWIN is determined by method 2,057 and NPIN is determined by method 2,059 of the Tenth Edition of the A.O.A.C. Official Methods of Analysis.

Slow release fertilizers made from nitrogenous wastes have been available for a long time, but until now there have been no methods provided in the prior art for increasing the normally low nitrogen availabilities in natural nitrogenous wastes to high levels so that the nitrogen from fertilizers derived therefrom is substantially available.

It is an object of this invention to provide a new method for preparing slow release nitrogen fertilizers from nitrogenous wastes which exhibit substantially complete availability of the nitrogen.

It is a further object of this invention to provide the operating parameters whereby this new method may be effectively carried out.

It is a further object of this invention to provide an improved organic waste based fertilizer exhibiting substantially complete availability of its nitrogen, prepared by the new method.

SUMMARY OF THE INVENTION

A new method has now been discovered for preparing organic waste based slow release highly available nitrogen fertilizers. It was found that a dry conditioned organic nitrogenous waste and a reactive ureaformaldehyde liquid oligomer could be coreacted as damp dry, free flowing, particles to form a granular slow release fertilizer. The new method converts organic waste nitrogen from a material exhibiting low nitrogen nutrient availability to a fertilizer which is substantially available for plant nutrition. The Nitrogen Availability Index for the composition prepared by the new method is considerably higher than those reported for waste nitrogen products of the prior art.

For the new method to function effectively, it was discovered that the organic waste must be dry conditioned first. It must be sized so that the particles are small enough to provide the high surface areas necessary for high reactivity, and dried so that the particles remain free flowing. Also, the ureaformaldehyde oligomer must be formed with a composition and activity sufficient to react fast enough to prevent the reaction mixture particulates from becoming wet and sticky and to keep them damp dry; but the oligomer must not be so active as to cause low nitrogen availabilities in the product granules.

The coreaction must be carried out with mineral acid catalysis and with control of pH, and reaction temperature. The reaction time is limited by neutralization of the acid catalyst, so that a high level of water insoluble nitrogen is achieved with substantially complete availability of the nitrogen as a plant nutrient.

The term damp dry describes granules which contain some moisture but are sufficiently dry on the surfaces that they are not sticky. Dry conditioning means that the organic nitrogenous waste is dried to the point where it is free flowing, and tumbles freely in a rotary drum and is sized fine enough to create a large reactive surface area.

The term reactive oligomer describes ureaformaldehyde molecules consisting of only a low number of monomer units, such as the dimer, trimer or tetramer, which are readily reacted with organic nitrogen compounds and with other oligomers to form water insoluble nitrogen compounds.

DETAILED DESCRIPTION OF THE INVENTION

The new method of the present invention comprises the coreaction of dry conditioned particulate organic nitrogenous waste and a reactive ureaformaldehyde liquid oligomer under conditions where the particles are damp dry and free flowing.

The conditions which must be followed to achieve the substantially complete availability of the slow release nitrogen, include the initial dry conditioning of the organic nitrogenous waste by drying and comminuting to form a mass of individual particles which contain between 1 and 25 percent moisture, and, on a dry basis, between 1 and 13 percent nitrogen. The conditioning must prepare this selected nitrogenous waste so that it will freely tumble in a rotating cylinder, and be sufficiently small in particle size to substantially pass through a U.S. Standard 4 Mesh Screen. Moistures higher than 25 percent do not allow free flow of the particles.

Also, essential to the efficacy of the new method is the forming of a ureaformaldehyde liquid oligomer having the required reactivity. This is achieved by heating aqueous urea and formaldehyde combined in a U/F molecular ratio between 1.3 and 3.0 to 1, at a pH between 5 and 8, at a temperature between 40 and 95° C., until the liquid oligomer is sufficiently reactive to solidify when heated to 105° C. for between 1 and 20 minutes.

The method is continued by charging the dry conditioned particulate organic nitrogenous waste to a cylinder rotating around its center axis at a speed sufficient to form the waste into granules, and at the same time adding to the waste an amount of the reactive ureaformaldehyde oligomer sufficient to provide between 15 and 85 percent of the nitrogen of the final fertilizer. The remainder of the nitrogen is derived from the organic nitrogenous waste. The materials are rolled together in the cylinder until the liquid oligomer is evenly distributed in the waste granules.

The coreaction of the conditioned nitrogenous waste and the reactive ureaformaldehyde oligomer is initiated by adding, and mixing in the rotating cylinder, sufficient mineral acid to provide a pH between 1.5 and 6.5 in the reaction mixture, and heating the mixture to a temperature between 45 and 110° C.

The coreaction is continued until between 35 and 75 percent of the nitrogen is insoluble in water. Then it is neutralized to a pH between 6 and 8, and cooled to a temperature lower than 45° C. after a coreaction time between 4 and 30 minutes while the availability of the water insoluble nitrogen is still substantially complete.

Animal excretia is a widely available source of nitrogenous waste which may be effectively used in the instant invention. It occurs in various practical forms, including: sewage sludge recovered from treating municipal sewage; industrial waste solids, recovered by settling, skimming, or filtration of industrial waste water, for example; poultry waste recovered as droppings from egg production operations; composted poultry waste recovered from growing and slaughtering chickens; municipal garbage, particularly where the putrescible materials are separated; and combinations of the foregoing materials.

The method of the instant invention may be operated with one, or all, of the steps carried out batchwise; however, from the standpoints of convenience and economics of operations, continuous operation is the preferred mode of operations.

The manner of dry conditioning of the nitrogenous wastes prior to coreaction with the ureaformaldehyde liquid oligomer is key to the effective working of the present method. Best performance of the method is obtained when the waste is dry conditioned to a moisture content between 10 and 25 percent, and a nitrogen content, on dry basis, between 2 and 6 percent, and is fine enough to substantially pass through a U.S. Standard 6 Mesh Screen.

The ureaformaldehyde liquid oligomer required in the instant method is prepared in the desirable reactive form preferably by heating aqueous urea and formaldehyde combined in a molecular ratio between 1.5 and 2.0 at a temperature between 60 and 90° C., until the liquid oligomer is sufficiently reactive that a test sample will solidify in a period of time between 4 and 8 minutes when heated to 105° C.

The requisite formaldehyde may be provided in the form of formalin, or a ureaformaldehyde concentrate, such as the commercially available UFC-85, which contains 60 percent formaldehyde, and 25 percent urea.

The instant method may be carried out in a cylindrical device equipped to rotate and granulate damp dry particulates and to evenly distribute therein the liquid ureaformaldehyde oligomer. The preferred device for carrying out the granulation, distribution, and coreaction is a horizontal cylinder rotating around its center axis, with an axis length to cylinder diameter ratio between 3 and 10. The cylinder is preferably operated at a cylinder rim speed between 0.2 and 2.0 meters per second.

The method for the waste granule formation, the blending to evenly distribute the reactive oligomer in the waste granules, the coreaction, and the neutralization to stop the coreaction may also be effectively performed in a mechanically fluidized cylinder.

In the operation of the instant method, it is preferred to use the amount of reactive ureaformaldehyde oligomer which is sufficient to provide between 40 and 80 percent of the total nitrogen in the fertilizer prepared from the mixture.

Some variations are allowable in the amounts of mineral acid used to initiate the coreaction depending upon the type and strength of the acid used; however, preferred performance is obtained when the amount of mineral acid mixed with the coreactants is sufficient to provide a pH between 2.0 and 4.0. Preferred temperatures for the coreaction are between 70 and 95° C. The mineral acids found most effective in the method are phosphoric acid, polyphosphoric acid, sulfuric acid, nitric acid, ammonium acid sulfate, magnesium chloride, and hydrochloric acid.

Key to the formation and retention of highly available slow release nitrogen in the present method is continuing the coreaction just until the necessary amount of water insoluble nitrogen is produced. The preferred amount of the total nitrogen which is water insoluble is between 45 and 70 percent.

To stop the coreaction at the desired conversion of nitrogen to water insolubility, it is necessary to neutralize the coreacting granules to a pH between 6.5 and 7.2 and cool to a temperature lower than 45° C., after a preferred coreaction time between 10 and 20 minutes to achieve water insoluble nitrogen Availability Indices between 60 and 95.

It was found that the product prepared by the instant method is a unique and improved granular slow release nitrogen fertilizer composition which provides slow release nitrogen, substantially completely available for plant nutrition.

In its most practical form, the method is carried out in continuous manner to prepare spheroid controlled release nitrogen fertilizer which substantially completely releases its nitrogen in one growing season. The method is operated by continuously coreacting dry conditioned nitrogenous animal excretia and reactive ureaformaldehyde liquid oligomer.

In this practical method, the animal excretia is dry conditioned by drying and comminuting until it forms a mass of individual particles comprising between 10 and 20 percent moisture and between 2 and 5 percent nitrogen, which tumble freely in a rotating cylinder and will substantially pass through a U.S. Standard 6 Mesh Screen.

A reactive ureaformaldehyde liquid oligomer is formed by heating aqueous urea and formaldehyde combined in a molecular ratio between 1.3 and 2.0 at a temperature between 60 and 90° C., until the liquid oligomer is sufficiently reactive that a sample will solidify in a period of time between 4 and 8 minutes when heated to 105° C.

In the most practical practice of the method, the dry conditioned animal excretia is continuously charged to a rotating horizontal cylinder having a length to diameter ratio between 3 and 6, rolled therein at a cylinder rim speed between 0.2 and 2.0 meters per second to form the excretia into granules. At the same time, to the excretia granules, is applied an amount of the reactive ureaformaldehyde oligomer sufficient to provide between 45 and 70 percent of the fertilizer nitrogen. Rotating the cylinder and its contents is continued until the reactive oligomer is evenly distributed in the excretia granules.

The coreaction of the dry conditioned animal excretia and the reactive ureaformaldehyde oligomer is initiated by continuously adding and mixing sufficient mineral acid to provide a pH in the rotating cylinder between 2.0 and 4.0, and by heating to a temperature between 70 and 90° C. The coreaction is continued until between 45 and 70 percent of the fertilizer nitrogen is insoluble in water.

After a coreaction time between 10 and 20 minutes, while the Availability Index is between 65 and 85 percent, the coreacted animal excretia and ureaformaldehyde oligomer are neutralized by continuously admixing sufficient aqueous base in the rotating cylinder to bring pH to between 6.5 and 7.2, and the product is cooled to a temperature lower than 45° C. to completely stop the coreaction.

The commercial practicality of the instant method is further improved by drying the spheroid neutralized slow release nitrogen fertilizer, produced by coreaction of excretia and oligomer, to a moisture content between 1 and 10 percent, and screening it. Fines which pass through the desired screens may be recycled for continuous charging, along with the dry conditioned animal excretia, to the rotating horizontal cylinder for inclusion in the coreacted granules.

The practical method provides an improved spheroid controlled release fertilizer composition which exhibits water insoluble nitrogen Availability Indices between 65 and 85.

Other plant nutrient materials may be added with the dry conditioned nitrogenous organic waste in the instant method when desired to balance or complete desired nutrient properties of the fertilizers prepared by the instant method. Additional primary nutrients phosphate and potassium may be combined in the granular products as triple superphosphate, ammonium phosphate, phosphate rock, potassium chloride, potassium sulfate, potassium nitrate, or sunflower seed ash. Similarly micronutrients salts containing iron, zinc, manganese, copper, and magnesium may be combined with the dry conditioned organic wastes so long as the required parameters defining the instant method are observed.

MODE OF OPERATION OF THE INVENTION

Having described the basic concepts of the instant invention, reference is now made to the following examples which are provided to illustrate the efficacious method of coreacting dry conditioned nitrogenous organic waste and reactive ureaformaldehyde oligomer to produce a granular slow release nitrogen fertilizer composition exhibiting substantially completely available nitrogen for plant nutrition and improved water insoluble nitrogen Availability Indices.

Example 1

This example demonstrates the preferred continuous operation of the new method and its efficacy using composted poultry manure as the nitrogenous organic waste starting material.

Composted poultry waste taken from commercial broiler operations in Eastern Maryland was dry conditioned by drying in a rotary drum dryer using combustion gases as the drying medium, by passing over a magnet to remove tramp iron, passing through a Fitz Mill, and screening through a 6 U.S. Standard Mesh Screen to provide a free flowing nitrogenous organic waste. Chemical analyses were determined as follows:

| Component | Wt % |
|---|---|
| Total Nitrogen | 2.9 |
| Cold Water Insoluble Nitrogen, CWIN | 2.4 |
| Availability Index of CWIN | 25.0 |
| Phosphate, $P_2O_5$ | 4.6 |
| Potassium, $K_2O$ | 2.1 |
| Moisture | 11.1 |

A reactive ureaformaldehyde liquid oligomer was prepared in a jacketed and stirred tank by first adding ureaformaldehyde concentrate, UFC-85, water, and then prilled urea in a U/F molecular ratio of 1.9 at a pH of 8.5. The pH was adjusted to 5.0 by adding small amounts of 10 percent formic acid and the clear solution was heated to 90° C. and held there until an oligomer sample was tested to show solid gel formation at 105° C. in 7 minutes. The oligomer was neutralized to pH 8.0. The analysis of the reactive oligomer was as follows:

| Component | Wt % |
|---|---|
| Total nitrogen, | 23.1 |
| Moisture | 35.0 |

Poultry compost was fed continuously at a rate of 1380 pound per hour from the drying-screening dry conditioning operations to the elevated end of a horizontal cylinder of the TVA Granulator type as freely tumbling particulates. The reactive ureaformaldehyde oligomer was continuously sprayed at a rate of 693 lbs per hour onto the dry conditioned particles in the first one-half of the granulator at a metered rate to provide 80.0 percent of the total nitrogen in the resulting fertilizer. The particulate dry conditioned poultry compost formed soft granules in which the reactive oligomer was evenly distributed in the first half of the horizontal cylinder. A small flow of combustion gases was sent through the cylinder to produce a maximum temperature in the cylinder of 92° C., and sulfuric acid was injected into the damp dry mixture in the third quarter of the cylinder to bring the pH of the still free tumbling mixture initially to 2.0 initiating the coreaction between the dry conditioned poultry waste and the reactive oligomer. The coreaction continued through the last half of the cylinder until 71 percent of the total nitrogen was converted to insoluble nitrogen. The pH naturally increased to 5.1 as the reaction proceeded, and a small amount of lime was added as the free flowing granules dropped from the lower end of the cylinder at a pH of 6.0 after a retention time of about 15 minutes. The product was dried in a rotary drum dryer and cooled to 38° C., stored, and analyzed. The analysis obtained is listed as follows:

| Component | Wt % |
|---|---|
| Total Nitrogen | 11.7 |
| Cold Water Insoluble Nitrogen, CWIN | 8.3 |
| Availability Index of CWIN | 76.1 |
| Phosphate, $P_2O_5$ | 3.7 |
| Potassium, $K_2O$ | 1.7 |
| Moisture | 5.0 |

The spheroid granules were screened and crush strength tests showed the average force required to crush a $-8+6$ mesh granule was 2.8 lbs, indicating hard spheroid particles.

Example 2

This example demonstrates the substantially complete availability of the slow release nitrogen as a plant nutrient in one growing season.

Strawberries were grown in a series of test plots in a well drained and irrigated Virginia soil. Nitrogen was supplied to the strawberry plots at a rate of 7 pounds per 1000 square feet in nylon net bags alongside the row of strawberry plants. The product of Example 1 was used as one of the nitrogen sources and the raw material composted poultry waste was used as the other source. At the end of a four month growing season, the nylon bags were retrieved, weighed and analyzed to determine the percent of the nitrogen which had been made available from the bags into the soil for plant nutrition. The results are tabulated as follows:

| Sample | Avg Percent N Available in 4 Months |
|---|---|
| Raw Material, Composted Poultry Waste | 36.1 |
| Product of Example 1 | 82.2 |

I claim:

1. A method of preparing granular slow release nitrogen fertilizer, exhibiting substantially complete nitrogen availability, by coreacting dry conditioned nitrogenous particulate wastes, and reactive ureaformaldehyde oligomer as free flowing solids, the method comprising:

(a) dry conditioning an organic nitrogenous waste by drying and comminuting until it forms a mass of individual particles, comprising between 1 and 25 percent moisture, and between 1 and 13 percent nitrogen, and exhibits properties of tumbling freely in a rotating cylinder and passing through a U.S. Standard 4 Mesh Screen;

(b) forming a reactive ureaformaldehyde liquid oligomer by heating aqueous urea and formaldehyde combined in a molecular ratio between 1.3 and 3.0 to 1, at a pH between 5 and 8, at a temperature between 40 and 95° C., until the liquid oligomer is sufficiently reactive to solidify in a period of time between 1 and 20 minutes when heated to 105° C.;

(c) charging the dry conditioned organic nitrogenous particulate waste to a cylinder rotating around its center axis at a speed sufficient to form the waste into granules, while concomitantly adding to the waste an amount of reactive ureaformaldehyde liquid oligomer sufficient to provide between 15 and 85 percent of the nitrogen of the fertilizer, and continuing to rotate the cylinder until the reactive oligomer is evenly distributed in the waste granules;

(d) initiating the coreaction of the dry conditioned nitrogenous waste and the reactive ureaformaldehyde oligomer by admixing therewith sufficient mineral acid in the rotating cylinder to provide therein a pH between 1.5 and 6.5, and heating the admixture to a temperature between 45 and 110° C.;

(e) continuing the coreaction until between 35 and 75 percent of the nitrogen is insoluble in water; and (f) neutralizing the coreacted waste and ureaformaldehyde oligomer to a pH between 6 and 8 and cooling to a temperature lower than 45° C. after a coreaction time between 4 and 30 minutes, while the availability of the slow release nitrogen is substantially complete.

2. The method of claim 1 wherein the organic nitrogenous wastes are animal excretia selected from the group consisting of sewage sludge, composted sewage sludge, industrial waste solids, poultry waste, composted poultry waste, municipal waste solids, and combinations thereof.

3. The method of claim 1 wherein the dry conditioned nitrogenous waste and the reactive ureaformaldehyde liquid oligomer are charged to the rotating cylinder and coreacted in a continuous manner.

4. The method of claim 1 wherein the dry conditioned nitrogenous waste comprises between 10 and 25 percent moisture, and on a dry basis between 2 and 6 percent nitrogen, and is sufficiently fine to substantially pass through a U.S. Standard 6 Mesh Screen.

5. The method of claim 1 wherein the reactive ureaformaldehyde oligomer is formed by heating aqueous urea and formaldehyde combined in a molecular ratio between 1.5 and 2.0 to 1.0 at a temperature between 60 and 90° C., until the liquid oligomer is sufficiently reactive to solidify in a period of time between 4 and 8 minutes when heated to 105° C.

6. The method of claim 1 wherein ureaformaldehyde concentrate is used as the source of the requisite amount of formaldehyde in preparing the reactive ureaformaldehyde oligomer.

7. The method of claim 1 wherein the granulating cylinder rotating around its center axis is arranged with its center axis in a horizontal configuration, exhibits an axis length to cylinder diameter ratio between 3 and 10, and is operated at a cylinder rim speed between 0.2 and 2.0 meters per second.

8. The method of claim 1 wherein the organic waste granule formation, the blending to evenly distribute the reactive oligomer in the waste granules, the coreaction, and the neutralization are carried out in a mechanically fluidized cylinder.

9. The method of claim 1 wherein the amount of reactive ureaformaldehyde liquid oligomer is sufficient to provide between 40 and 80 percent of the fertilizer nitrogen.

10. The method of claim 1 wherein sufficient mineral acid is admixed with organic waste and the liquid oligomer to provide a pH between 2.0 and 4.0 in the admixture and wherein the admixture is heated to a temperature between 70 and 95° C.

11. The method of claim 1 wherein the mineral acid is selected from the group consisting of phosphoric acid, sulfuric acid, nitric acid, polyphosphoric acid, ammonium acid sulfate, magnesium chloride and hydrochloric acid.

12. The method of claim 1 wherein the coreaction is continued until between 45 and 70 percent of the fertilizer nitrogen is insoluble in water.

13. The method of claim 1 wherein the coreacted organic nitrogenous waste and the ureaformaldehyde oligomer is neutralized to a pH between 6.5 and 7.2, and cooled to a temperature lower than 45° C after a coreaction time between 10 and 20 minutes while water insoluble nitrogen Availability Index is between 60 and 95.

14. The method of claim 1 wherein other primary nutrients are added to the dry conditioned nitrogenous organic wastes, the primary nutrients being selected from the group consisting of triple superphosphate, ammonium phosphate, phosphate rock, potassium chloride, potassium sulfate, potassium nitrate, and sunflower seed ash.

15. The method of claim 1 wherein secondary and micronutrients are added to the dry conditioned nitrogenous organic waste, the secondary and micronutrients being selected from the group consisting of salts of iron, zinc, manganese, copper, and magnesium.

16. The improved granular slow release nitrogen fertilizer composition prepared by the method of claim 1 which provides slow release nitrogen substantially completely available for plant nutrition.

17. A continuous method of preparing spheroid controlled release nitrogen fertilizer exhibiting substantially complete nitrogen availability in one growing season, by coreacting dry conditioned nitrogenous animal excretia and reactive ureaformaldehyde liquid oligomer, the method comprising:
(a) dry conditioning the nitrogenous animal excretia by drying and comminuting until a mass of individual, free flowing, particles are formed comprising between 10 and 20 percent moisture and between 2 and 5 percent nitrogen, and exhibiting properties of tumbling freely in a rotating cylinder and passing through a U.S. Standard 6 Mesh Screen;
(b) forming a reactive ureaformaldehyde liquid oligomer by heating aqueous urea and formaldehyde combined in a molecular ratio between 1.3 and 2.0 at a temperature between 1.5 and 2.0 at a temperature between 60 and 95° C., until the liquid oligomer is sufficiently reactive to solidify in a period of time between 4 and 8 minutes when heated to 105° C.;
(c) continuously charging the dry conditioned animal excretia to a rotating horizontal cylinder, exhibiting a length to diameter ratio between 3 and 6, rolling said excretia therein at a cylinder rim speed between 0.2 and 2.0 meters per second to form the excretia into spheroids, concomitantly applying to the excretia granules an amount of reactive ureaformaldehyde oligomer sufficient to provide between 45 and 70 percent of the fertilizer nitrogen, and continuing to rotate the cylinder until the reactive oligomer is evenly distributed in the excretia spheroids;
(d) initiating the coreaction of the dry conditioned animal excretia and the reactive ureaformaldehyde oligomer by continuously admixing therewith sufficient mineral acid to provide a pH in the rotating cylinder between 2.0 and 4.0, and heating to a temperature between 70 and 90° C.;
(e) continuing the coreaction until between 45 and 70 percent of the fertilizer nitrogen is insoluble in water;
(f) neutralizing the coreacted animal excretia and ureaformaldehyde oligomer spheroids to a pH between 6.5 and 7.2 by continuously admixing in the rotating cylinder sufficient base, and cooling to a temperature lower than 45° C. after a coreaction time between 10 and 20 minutes while the Availability Index of the nitrogen is between 65 and 85 percent.

18. The method of claim 17, wherein the neutralized coreacted excretia and oligomer spheroids are dried in an external dryer to a moisture content between 1 and 10 percent and screened, with fines recycled for continuous charging with the dry conditioned animal excretia to the rotating horizontal cylinder for inclusion in the coreacted granules.

19. The improved spheroid controlled release fertilizer composition exhibiting water insoluble nitrogen Availability Indices between 65 and 85 prepared from dry conditioned animal excretia and reactive ureaformaldehyde oligomer by the method of claim 17.

* * * * *